United States Patent [19]

Lotspeich et al.

[11] Patent Number: 4,976,449
[45] Date of Patent: Dec. 11, 1990

[54] PORTABLE WHEEL DOLLY

[75] Inventors: Wayne D. Lotspeich, Selah; Lee R. Irwin, Yakima, both of Wash.

[73] Assignee: Lotspeich-Irwin-Crotty, Inc., Yakima, Wash.

[21] Appl. No.: 374,288

[22] Filed: Jun. 29, 1989

[51] Int. Cl.$^5$ .............................................. B60P 3/40
[52] U.S. Cl. .................................. 280/79.4; 254/2 R; 414/427; 414/429
[58] Field of Search ............... 254/2 R; 414/426, 427, 414/428, 429, 430; 280/79.4, 79.11

[56] References Cited

U.S. PATENT DOCUMENTS

| | | | |
|---|---|---|---|
| 2,380,415 | 7/1945 | Carruthers | 414/429 |
| 2,812,086 | 11/1957 | Kuenzi | 414/429 |
| 3,583,723 | 6/1971 | Nowell et al. | 280/79.4 |
| 4,286,369 | 9/1981 | Fusco | 414/426 X |
| 4,692,082 | 9/1987 | Smith | 414/429 |
| 4,784,402 | 11/1988 | Roman | 280/79.4 |

Primary Examiner—Charles A. Marmor
Assistant Examiner—Michael Mar
Attorney, Agent, or Firm—Christensen, O'Connor, Johnson & Kindness

[57] ABSTRACT

A portable wheel dolly (10) comprised of a shaft (12), a first support frame (14) and a second support frame (16) held in spaced, parallel relationship in an operating configuration and in end-to-end relationship in a stored configuration. The first and second support frames (14 and 16) have inclined face plates (36) to support one or more tires in an upright position. The shaft (12) slides through slip sleeves (40) at the midpoint of the first and second support frames (14 and 16) and engages nut (48) to hold the dolly (10) in the operating configuration. The shaft (12) slides through sleeves (50) and engages a nut (52) to hold the first and second support frames (14 and 16) in the stored configuration.

20 Claims, 2 Drawing Sheets

PORTABLE WHEEL DOLLY

TECHNICAL FIELD

The present invention pertains to wheel dollies and, more particularly, to a portable wheel dolly that assembles to support of pair of dual-mounted wheels and tires in an upright position and disassembles for storage.

BACKGROUND OF THE INVENTION

Most heavy-duty vehicles utilize dual-mounted tires to support large loads. A dual tire arrangement typically consists of a pair of tires mounted on wheels in a side-by-side configuration on a drum that is then mounted on each side of an axle. Because dual wheels and tires are heavy, two or more people are required to lift the tires and wheels onto an axle or to remove them from the axle. As a result, a number of wheel dollies have been developed to facilitate removal and mounting of dual tires on an axle by one person.

In the past, wheel dollies have typically been designed to have two forks that protrude from a vertical frame member and that are supported above the ground on wheels. After the dual tires are raised, the forks are rolled under the tires from the side, and the tires, including the wheels and drum, are then pulled off the axle to rest on the forks. While these dollies have been suitable for use in garages and shops, they have several drawbacks that render them unsuitable for use on the road.

First, the vertical support member attached at the end of the forks blocks access to the axle bolts when the dolly is rolled into position next to the tires. As a result, the dual wheels and the dolly must be moved in order to provide access to the axle for repair of brakes, seals, etc., sometimes requiring more than one person to safely do so. In addition, current wheel dollies are not easily disassembled for storage, requiring tools and a significant amount of time. Furthermore, when they can be disassembled, these dollies require substantial space for storage. Consequently, previous wheel dollies cannot be safely used by one person and they are not suitable for use on the road in an emergency or for storage on a vehicle.

SUMMARY OF THE INVENTION

The present invention is directed to a portable wheel dolly having a pair of support members adapted to be attached to each other in end-to-end relationship for storage and further adapted to be connected in spaced, parallel relationship by a connecting member such that a set of dual wheels are supported in an upright position on the support members when removed from the vehicle.

In accordance with another aspect of the present invention, the wheel dolly is supported above the ground by wheels, and, more preferably, swivel casters.

In accordance with yet another aspect of the present invention, the first and second support members are comprised of first and second elongate frame members, each frame member having a first end, a second end, and a planar face that at least partially spans the frame members between the first and second ends, and a connecting member for connecting the first and second frames in either an operating configuration or a stored configuration. In the operating configuration, the first and second frame members are held in spaced, parallel relationship such that the planar faces cooperate with a tread portion of both tires to support the dual tires in an upright position on the frame members. In the stored configuration, the first and second frame members are held in end-to-end relationship by the connecting member.

In accordance with yet another aspect of the present invention, the planar faces are inclined and positioned to face one another when the first and second frame members are connected in the operating configuration.

In accordance with still yet another aspect of the present invention, the connecting member is attached at a midpoint between the first and second ends on each of the elongate frame members.

In accordance with a further aspect of the present invention, the connecting member comprises a connecting bar having threaded ends that are threadably received at the midpoint of the first and second frame members when the dolly is assembled in the operating configuration and, further, are threadably received within the first and second frame members when the dolly is assembled in the stored configuration.

BRIEF DESCRIPTION OF THE DRAWINGS

The foregoing and other features and advantages of the present invention will be more readily appreciated as the same becomes better understood by reference to the following detailed description when taken in conjunction with the accompanying drawings, wherein.

DETAILED DESCRIPTION OF THE PREFERRED EMBODIMENT

Figure 1:
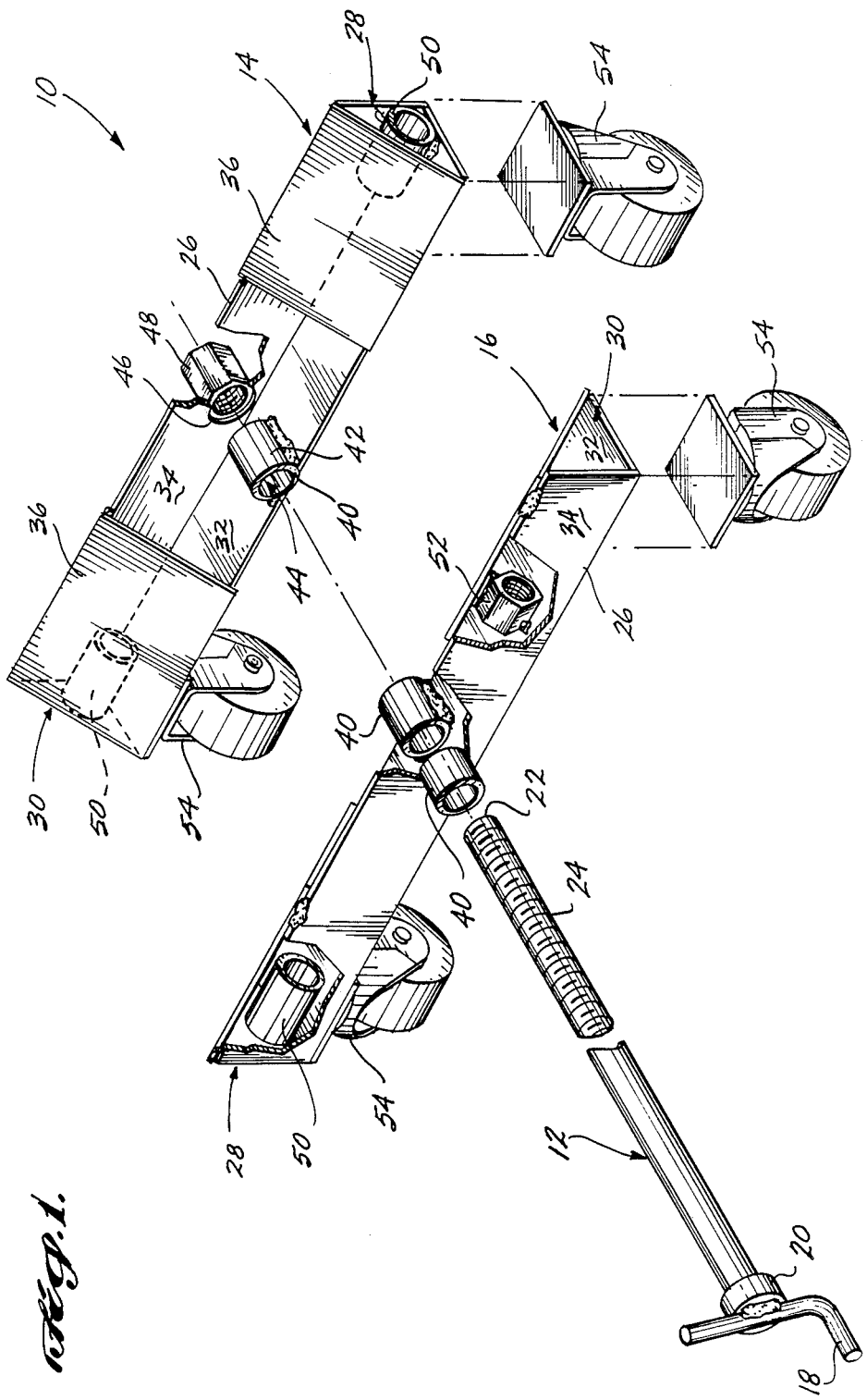
FIG. 1 is a partially exploded isometric view of a portable wheel dolly formed in accordance with the present invention.

Referring initially to FIG. 1, the portable wheel dolly 10 comprises three major components, a shaft 12, a first support frame 14, and a second support frame 16. While the description of the representative embodiment will include dimensions to aid in better understanding the present invention, it is to be understood that the present invention may be constructed on a different scale without departing from the spirit and scope of the invention.

The shaft 12 comprises a $36'' \times \frac{3}{4}''$ rod having a handle 18 welded to an enlarged portion 20 at one end. The enlarged portion 20 acts as a spacer to ensure there is adequate spacing from the support frames to turn the handle 18. The other end 22 is threaded, preferably, 14" up the shaft 12.

The first and second support frames 14 and 16 are each constructed of an angle iron base 26 having a first end 28, a second end 30, a horizontal leg 32, and a vertical leg 34. Ideally, a quarter-inch angle iron that is $20'' \times 3'' \times 3''$ in size is used. Face plates 36, sized at $\frac{3}{8}'' \times 6'' \times 4\frac{1}{2}''$, are welded across the horizontal leg 32 and the vertical leg 34 at the first and second ends 28 and 30. In the space 38 between the face plates 36 on each support frame 14 and 16 is welded a slip sleeve 40 on the horizontal leg 32. Each slip sleeve 40 is formed from an elongate cylindrical wall 42 that defines an internal axial bore 44. The slip sleeves 40 are oriented to have their longitudinal axes positioned transverse to the longitudinal axis of the first and second support frames 14 and 16. The slip sleeves 40 are spaced from the vertical leg 34 a sufficient distance to allow the shaft 12 to slide between the slip sleeve 40 and the vertical leg 34.

An opening 46 is formed in the horizontal leg 32 of the base 26 in axial alignment with the slip sleeves 40. On the outside of the horizontal leg 32 on the first support frame 14 is welded a ¾" nut 48 in axial alignment with the opening 46. On the outside of the horizontal leg 32 on the second support frame 16 is welded another slip sleeve 40. The internal bore 44 of each slip sleeve 40 is sized to slidably receive the shaft 12, with the threaded end 22 of the shaft being threadably received within the nut 48.

The first support frame 14 has two additional slip sleeves 50 welded at the first and second ends 28 and 30 near the intersection of the horizontal and vertical legs 32 and 34. These slip sleeves 50 are oriented to have their longitudinal axes parallel to the longitudinal axis of the first support frame 14. The second support frame 16 has a slip sleeve similarly welded at it first end 28. However, behind the face plate 36 at the second end 30 is welded a ¾" nut 52 in axial alignment with the slip sleeve 50. The slip sleeves 50 are sized to slidably receive the shaft 12, and the nut 52 is sized to threadably receive the shaft 12.

Swivel casters, preferably of 1¾" size, are attached to the horizontal leg 32 at the first and second ends 28 and 30 of the first and second support frames 14 and 16. The swivel casters 54 support the first and second support frames 14 and 16 above the ground and enable rolling movement of the tire dolly 10 in any direction.

Figure 2:
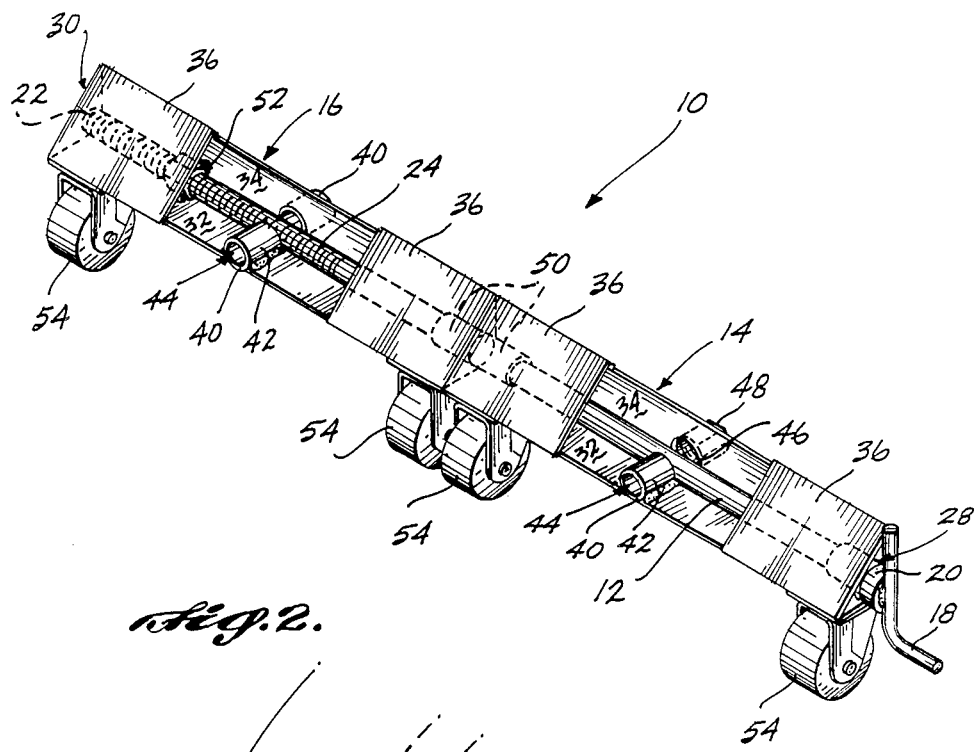
FIG. 2 is an isometric view of the portable wheel dolly in the stored configuration.

Referring next to FIG. 2, the portable wheel dolly 10 is shown in a stored configuration. As such, the shaft 12 extends through the first support frame 14 from the first end 28, through the second end 30, thence through the first end 28 of the second support frame 16 and into engagement with the nut 52. The shaft 12 passes through the slip sleeves 50 to hold the first and second support frames 14 and 16 in end-to-end engagement. The shaft 12 is then turned clockwise by the handle 18 to tighten the engagement with the nut 52 to bring the first and second support frames 14 and 16 into snug engagement. When so configured, the portable wheel dolly 10 can be easily stored and retrieved for use.

Figure 3:
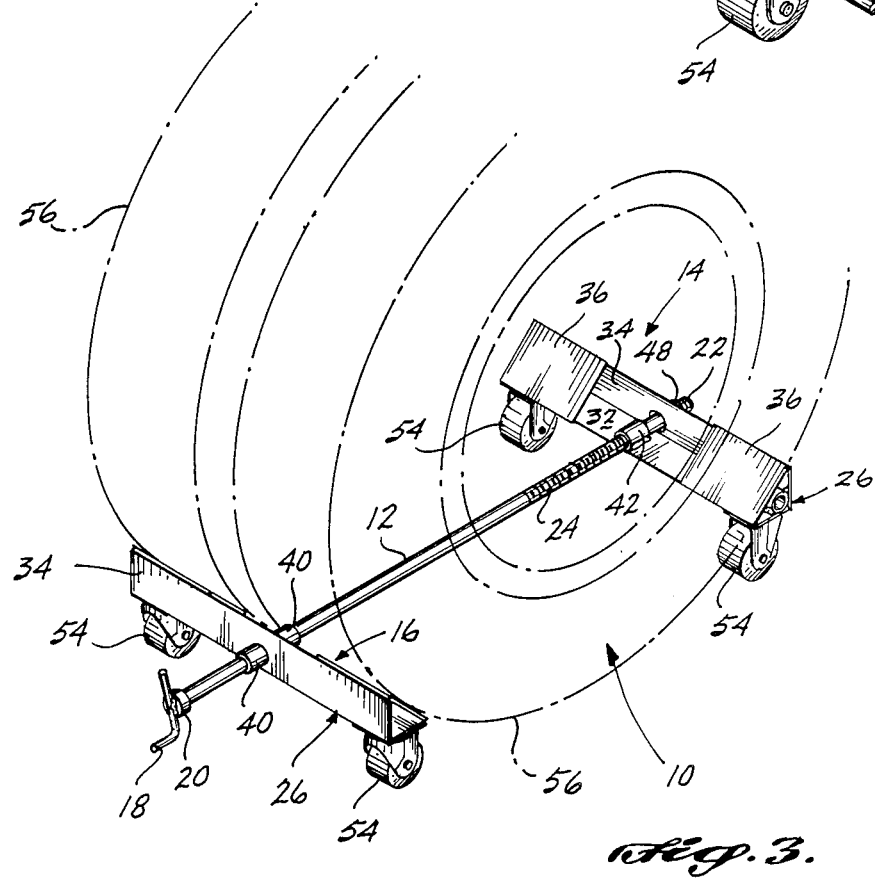
FIG. 3 is an isometric view of the portable wheel dolly in the operating configuration.

Referring next to FIG. 3, the portable wheel dolly 10 is shown in an operating configuration. To assemble the dolly 10, the shaft 12 is unthreaded from the nut 52 and removed from the slip sleeves 50. The second support frame 16 is positioned to have the inclined face plates 36 face toward each other so that the first and second support frames 14 and 16 are in spaced, parallel relationship. The shaft 12 is then slid, threaded end first, through the slip sleeves 40 in the second support frame 16 and through the slip sleeves 40 in the first support frame 14 and into threaded engagement with the nut 48. When wheels 56 are supported on the support frames 14 and 16, the distance between the first and second support frames 14 and 16 can be adjusted by simply turning the shaft 12. The dual wheels 56 are supported in an upright position on the dolly 10 by the cooperation of the inclined face plates 36 and the tread of the wheels 56. The shaft 12 passes between the wheels 56, thus avoiding interference with the wheels 56 during mounting and dismounting.

The present invention is lightweight and simple to use, facilitating safe and quick roadside repairs. For instance, in the case of a vehicle having brake and seal problems on the road, the dolly 10 is easily retrieved from storage and disassembled from the stored configuration. With the dolly 10 disassembled, the affected axle is jacked up to raise the dual wheels off the road. In cases of extremely rocky terrain, a board or other flat object may be slid under the wheels and tires 56 to provide a smooth surface for rolling of the dolly 10. The front support frame 14 and the second support frame 16 are placed against the front and rear of the wheels and tires 56, as shown in FIG. 3. The shaft 12 is then inserted through the slip sleeves 40 to pass between the tires 56 and into the first support frame 14. The handle 18 is turned clockwise to bring the first and second support frames 14 and 16 together. With the tires then jacked up to approximately 1" off the road, the shaft 12 is turned clockwise to bring the first and second support frames 14 and 16 into snug engagement with the wheels and tires 56. Upon removal of the axle-retaining nut and release of the parking brakes, the dual wheel and tire unit is then slid off the axle by rolling the wheel dolly 10 away from the axle. Access can then be had to the brakes, seals, and hub components with the duals remaining on the dolly 10. Once the brakes or seals are repaired, the duals are repositioned on the axle by following the reverse of the steps described above. The hole alignment of the wheels to the spindle will remain fixed while the duals remain on the dolly, thereby minimizing possible damage to the seals and bearings.

While a preferred embodiment of the invention has been illustrated and described, it is to be understood that various changes may be made therein without departing from the spirit and scope of the invention. Consequently, the invention is to be limited only by the scope of the claims which follow.

The embodiments of the invention in which an exclusive property or privilege is claimed are defined as follows:

1. A portable wheel dolly for supporting a set of dual wheels, the wheel dolly comprising:
    a first elongate frame member, said first frame member having a first end, a second end, and one or more planar faces at least partially spanning said first member between said first end and said second end;
    a second elongate frame member, said second elongate frame member having a first end, a second end, and one or more planar faces at least partially spanning said second frame member between said first end and said second end;
    means for connecting said first and said second frame members in either an operating configuration, wherein said first and second frame members are held in spaced, parallel relationship such that said planar faces cooperate with a tread portion of a set of dual wheels to support the dual wheels in an upright position, or a stored configuration, wherein said first and second frame members are held in end-to-end relationship, said means for connecting said first and second frame members including a connecting bar that is received within said first and second frame members; and
    means within one of said first and second frame members for securing one end of said bar thereto when assembled in the stored configuration.

2. The dolly of claim 1, wherein said planar faces are inclined and positioned to face one another when said first and second frame members are in the operating configuration.

3. The dolly of claim 2, wherein said first and second frame members are mounted on wheel means for rolling the dolly.

4. The dolly of claim 3, wherein said wheel means comprises a plurality of swivel casters.

5. The dolly of claim 1, wherein said connecting means is received at a midpoint between said first and second ends on each of said elongate frame members when assembled in the operating configuration.

6. The portable wheel dolly of claim 1, wherein said connecting bar includes a threaded end that is threadably received within one of said first and second frame members when assembled in the stored configuration.

7. A portable wheel dolly for supporting a set of dual wheels, the wheel dolly comprising:
    a first elongate frame member, said first frame member having a first end, a second end, and one or more planar faces at least partially spanning said first member between said first end and said second end;
    a second elongate frame member, said second elongate frame member having a first end, a second end, and one or more planar faces at least partially spanning said second frame member between said first end and said second end;
    means for connecting said first and said second frame members in either an operating configuration, wherein said first and second frame members are held in spaced, parallel relationship such that said planar faces cooperate with a tread portion of the set of dual wheels to support the dual wheels in an upright position, or a stored configuration, wherein said first and second frame members are held in end-to-end relationship, said means for connecting comprising a connecting bar having a threaded end that is threadably received at the midpoint of one of said first and second frame members when assembled in the operating configuration, and further, wherein said bar is received within said first and second frame members with said threaded end being threadably received within one of said first and second frame members when assembled in the stored configuration.

8. The dolly of claim 7, wherein said planar faces are inclined and positioned to face one another when said first and second frame members are in the operating configuration.

9. The dolly of claim 8, wherein said first and second frame members are mounted on wheel means for rolling the dolly.

10. The dolly of claim 9, wherein said wheel means comprises a plurality of swivel casters.

11. A portable wheel dolly for supporting a set of dual wheels, the wheel dolly comprising:
    a first elongate frame member, said first frame member having a first end, a second end, and one or more engaging surfaces at least partially spanning said first member between said first end and said second end;
    a second elongate frame member, said second elongate frame member having a first end, a second end, and one or more engaging surfaces at least partially spanning said second frame member between said first end and said second end;
    means for connecting said first and said second frame members in either an operating configuration, wherein said first and second frame members are held in spaced, parallel relationship such that said engaging surfaces cooperate with a tread portion of the set of dual wheels to support the dual wheels in an upright position, or a stored configuration, wherein said first and second frame members are held in end-to-end relationship, said means for connecting said first and second frame members including a connecting bar that is received within said first and second frame members; and
    means within one of said first and second frame members for securing one end of said bar thereto when assembled in the stored configuration.

12. The portable wheel dolly of claim 11, wherein said engaging surfaces are planar faces.

13. The wheel dolly of claim 12, wherein the planar faces are inclined and positioned to face one another when said first and second frame members are in the operating configuration.

14. The wheel dolly of claim 13, wherein said first and second frame members are mounted on wheel means for rolling the dolly.

15. The wheel dolly of claim 14, wherein said wheel means comprises a plurality of swivel casters.

16. The wheel dolly of claim 11, wherein said connecting means is received at a midpoint between said first and second ends on each of said elongate frame members when assembled in the operating configuration.

17. The wheel dolly of claim 16, wherein said connecting bar has a threaded end that is threadably received at the midpoint of one of said first and second frame members when assembled in the operating configuration, and further, wherein said bar is received within said first and second frame members with said threaded end being threadably received within one of said first and second frame members when assembled in the stored configuration.

18. The wheel dolly of claim 17, wherein said engaging surfaces are planar faces that are inclined and positioned to face one another when said first and second frame members are in the operating configuration.

19. The wheel dolly of claim 18, wherein said first and second frame members are mounted on wheel means for rolling the dolly.

20. The wheel dolly of claim 19, wherein said wheel means comprises a plurality of swivel casters.

* * * * *